US006912502B1

(12) United States Patent
Buddle et al.

(10) Patent No.: US 6,912,502 B1
(45) Date of Patent: Jun. 28, 2005

(54) SYSTEM AND METHOD FOR COMPLIANCE MANAGEMENT

(75) Inventors: James Joseph Buddle, Doylestown, PA (US); Brenda Sue Burke, Budapest (HU); Rodney Albert Perkins, Richmond, VA (US); Leon Ellis Roday, Richmond, VA (US); Renee Tartaglia, Brussels (BE); Ivan Antonio Vermiglio, Chicago, IL (US)

(73) Assignee: Genworth Financial, Inc.,, Richmond, VA (US)

( * ) Notice: Subject to any disclaimer, the term of this patent is extended or adjusted under 35 U.S.C. 154(b) by 0 days.

(21) Appl. No.: 09/474,775

(22) Filed: Dec. 30, 1999

(51) Int. Cl.[7] ............................................. G06F 17/60
(52) U.S. Cl. ............................................ 705/1; 705/10
(58) Field of Search ............................... 705/1, 4, 7, 8, 705/9, 10, 28, 35, 54; 707/10, 102, 104.1, 200, 201; 700/95; 713/1

(56) References Cited

U.S. PATENT DOCUMENTS 5,680,305 A * 10/1997 Apgar, IV ................... 705/10
6,029,144 A * 2/2000 Barrett et al. ................. 705/30
6,067,549 A    5/2000 Smalley et al.
6,163,732 A   12/2000 Petke et al.
2002/0002475 A1  1/2002 Freedman et al.
2002/0002488 A1  1/2002 Muryes et al.
2002/0019754 A1  2/2002 Peterson et al.
2002/0120642 A1 * 8/2002 Fetherston .................. 707/500

FOREIGN PATENT DOCUMENTS

JP         06124285 A   *  5/1994

* cited by examiner

Primary Examiner—John G. Weiss
Assistant Examiner—Igor Borissov
(74) Attorney, Agent, or Firm—Hunton & Williams LLP (57) ABSTRACT

A system and method for use in compliance management is disclosed. Various compliance requirements and issues may be identified for business process and products. The individuals or entities responsible for the business processes and products are identified. Action plans based on compliance requirements and issues may be created. The action plans may be forward to the appropriate individuals or entities, and the results of the action plans monitored to determine whether compliance requirements and issues are being appropriately addressed.

34 Claims, 8 Drawing Sheets

| | | SEVERITY | OCCURRENCE | DETECTION | RISK SCORE |
|---|---|---|---|---|---|
| SALES & MARKETING | | | | | |
| A. | Advertising - Approval | 10.0 | 2.0 | 3.0 | 60.0 |
| B. | Advertising - Out of Date | 6.0 | 2.0 | 6.0 | 72.0 |
| C. | Advertising - Process | 10.0 | 2.0 | 6.0 | 120.0 |
| D. | Illustrations | 10.0 | 3.0 | 5.0 | 150.0 |
| E. | Distribution Channel | 10.0 | 3.0 | 6.0 | 180.0 |
| F. | Disclosure/Misrepresentation | 10.0 | 3.0 | 9.0 | 270.0 |
| G. | Agent Termination | 4.0 | 3.0 | 5.0 | 60.0 |
| H. | Licensing/Screening/Appoint | 6.0 | 3.0 | 3.0 | 54.0 |
| I. | Replacements | 8.0 | 3.0 | 6.0 | 144.0 |
| J. | Third Party Sales & Marketing | 10.0 | 1.0 | 0.0 | 0.0 |
| SERVICING | | | | | |
| A. | Underwriting Discrimination | 4.0 | 2.0 | 8.0 | 64.0 |
| B. | Policy Delivery | 3.0 | 2.0 | 1.0 | 6.0 |
| C. | Adverse Underwriting Decision | 4.0 | 2.0 | 3.0 | 24.0 |
| D. | Claims Process | 5.0 | 2.0 | 4.0 | 40.0 |
| E. | Customer Service | 6.0 | 2.0 | 3.0 | 36.0 |
| F. | Complaints | 6.0 | 2.0 | 4.0 | 48.0 |
| G. | Privacy Disclosure | 3.0 | 2.0 | 6.0 | 36.0 |
| H. | Record Retention & Maintenance | 1.0 | 2.0 | 3.0 | 6.0 |
| I. | Policy Holder Statements | 4.0 | 2.0 | 6.0 | 48.0 |
| J. | Third Party Servicing | 6.0 | 1.0 | 0.0 | 0.0 |

FIG. 4

|  | Issue #: | |
|---|---|---|
|  | Status: | NA |
|  | Prepared By: | |
|  | Date Created: | |

◆ Title:
  Completed:

---

◆ Risk: •High  •Low  •Medium

◆ Source  Choose one . . . . . . . .

◆ Category: Choose one . . . . . . . . .
  Target Date: NA

---

◆ Locations:  ☐ Agoura           ☐ Richmond Operations
              ☐ Chicago          ☐ San Rafeal
              ☐ Corporate        ☐ Stamford
              ☐ DC               ☐ Trevose
              ☐ Japan            ☑ Valley Forge
              ☐ Lynchburg
              ☐ Mexico
              ☐ New York
              ☐ Richmond (CB)

---

◆ Function:  ☑ Advertising Material   ☐ Issue Management
             ☑ Claims                 ☑ Licensing
             ☐ Commissions            ☐ Other
             ☐ Complaints             ☐ Pricing/Ratings
             ☐ Compliance/Quality     ☐ Replacements
             ☐ Form Filing            ☐ Sales/Marketing
             ☐ Illustrations          ☐ Systems

---

◆ Description:

FIG. 5A

- Product:
  - ☑ Accidental Death
  - ☑ Accidental Disability
  - ☑ Annuity-Equity Indexed
  - ☑ Annuity-Fixed (Deferred)
  - ☑ Annuity-Fixed (Immediate)
  - ☑ Annuity-Variable
  - ☑ Auto
  - ☑ Auto Warranty
  - ☑ Credit Disability
  - ☑ GIC
  - ☑ Group Disability
  - ☑ Homeowners
  - ☑ Life-Credit
  - ☑ Life-Group
  - ☑ Life-Interest Sensitive
  - ☑ Life-Second To Die
  - ☑ Life-Term
  - ☑ Life-Variable
  - ☑ Life-Whole
  - ☑ Long Term Care
  - ☑ Mechanical Breakdown Insurance
  - ☑ Medical Supplement
  - ☐ Mutual Funds
  - ☐ NA
  - ☑ Other
  - ☑ Structured Settlement
  - ☑ Supplemental Care

- Channel:
  - ☐ Auto Warranty Services
  - ☑ BSG - Auto Dealer
  - ☑ BSG - Consumer Benefits Direct
  - ☑ BSG - Lifestyle Products
  - ☑ BSG - Partnership/Affinity
  - ☑ Career - LTC Services
  - ☑ Career - PFS
  - ☑ Colonial Penn Direct
  - ☑ FSG - Bank
  - ☑ FSG - Financial Planner/CPS
  - ☑ FGS_PPGA
  - ☑ FSG - Securities Broker
  - ☑ Independent Brokerage
  - ☑ Investment Services Group
  - ☑ Other
  - ☑ Worksite

SYSTEM AND METHOD FOR COMPLIANCE MANAGEMENT

FIELD OF THE INVENTION

The present invention relates to a system and method for managing compliance issues in a regulated industry and more specifically to managing compliance issues in the financial services industry.

BACKGROUND OF THE INVENTION

Various industries must comply with a multitude of federal, state, and local laws and regulations. The case of an insurance industry may be illustrative. Each insurer must comply with various federal regulations. An insurer must hold a certificate of authority in the state it operates. Furthermore, an agent of the insurer must be licensed with the state and appointed with the company. Each state may have different requirements regarding disclosure of information to customers, the amount of liquidity an insurer must maintain, and other regulations regarding the actions of the insurer. Further, different products may have different requirements under various regulations. Therefore, insurers who offer products in a plurality of states may suffer from the difficulty and expense of ensuring compliance to a number of different regulations.

Additionally, different regulations may raise the same or similar issues for an insurer. In the example of the insurance industry, different federal, state, and local laws, regulations and self-regulatory organizations may raise the same or similar issues. By way of example, different insurance products (e.g., life insurance, health insurance, etc.) may be governed by different regulations, but may raise the same regulatory issues. A regulated business, however, may suffer from the drawback of being unable to identify similar issues for different products, or similar issues raised in subsidiary or related corporations. A business may then duplicate efforts to address issues, thereby potentially wasting time and resources. Although an insurance industry is provided as an example, the same may be applied to other financial services industries and other regulated businesses.

After identifying an issue, a regulated business may form an action plan to ensure compliance with the regulations. However, such action plans may be difficult to track and determine if the business is complying with the laws and regulations.

These and other drawbacks exist.

SUMMARY OF THE INVENTION

An object of the present invention is to overcome these and other drawbacks in existing systems and methods.

Another object of the invention is to provide a system and method for identifying compliance issues for various business processes.

Another object of the invention is to provide various tools for identifying compliance issues wherein tools for identifying compliance issues may include self-assessment tools, risk propagation tools, dashboards, trend spotting, litigation results, and other methods of identifying compliance issues.

Another object of the invention is to utilize a self-assessment tool to determine potential risk areas based on the severity of an issue, occurrence magnitude, and detection capability.

Another object of the invention is to administer a self-assessment tool as a questionnaire where answers to the questionnaire are converted into a numeric risk score.

Another object of the invention is to utilize risk propagation to identify compliance issues wherein common risk areas and regulatory requirements are identified and applied to common risk areas of other affected channels and functions.

Another object of the invention is to utilize dashboards to identify compliance issues wherein dashboards may be used to collect, process and display data.

Another object of the invention is to implement trend spotting capabilities to identify compliance issues, such as trends in customer complaints.

Another object of the invention is to develop an action plan for each compliance issue.

Another object of the invention is to determine compliance ownership of a compliance issue where the compliance owner is responsible for the resolution of the compliance issue.

Another object of the invention is to implement an issue tracking database for reviewing and analyzing results of an action plan wherein the issue tracking database provides a central repository of compliance issues and action plans.

Other objects and advantages exist for the present invention.

DETAILED DESCRIPTION OF THE PREFERRED EMBODIMENTS

The present invention is described in relation to a system and method for the compliance management in the financial services industry. Nonetheless, the characteristics and parameters pertaining to the system and method may be applicable to other types of compliance in regulated industries or whenever compliance with particular rules in a business context is important, including other financial institutions, such as insurance companies, banks, and mortgage companies.

Figure 1:
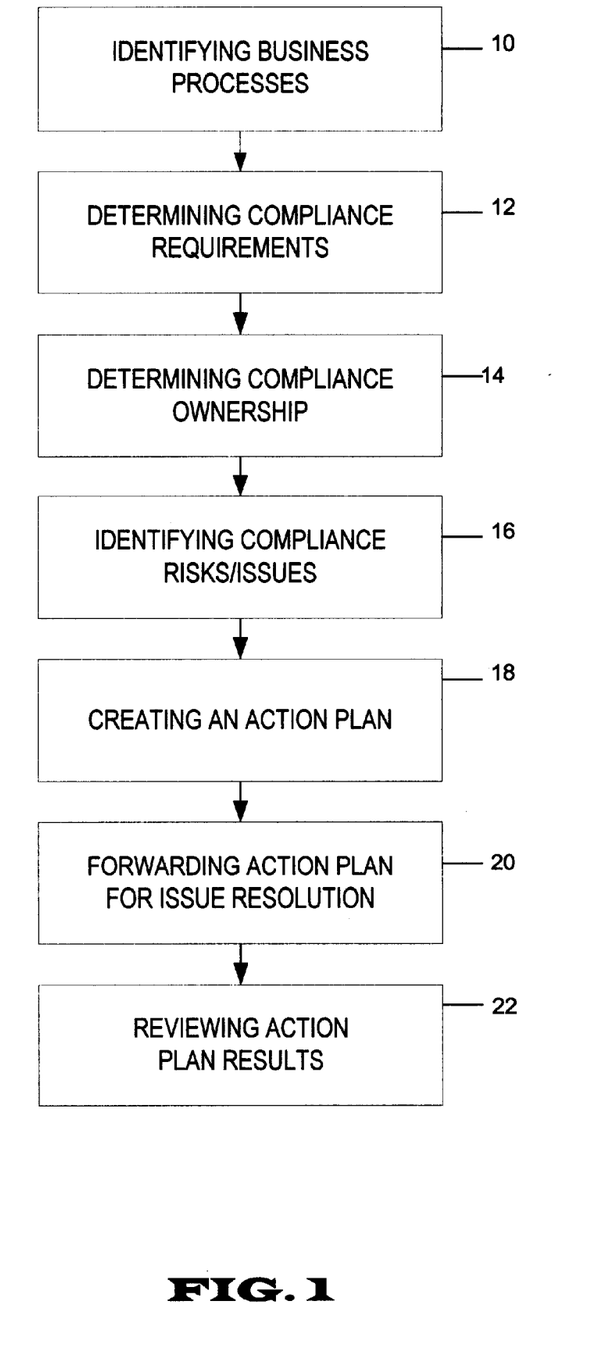
FIG. 1 is a flow chart illustrating the steps for compliance management according to an embodiment of the invention.
Figure 6:
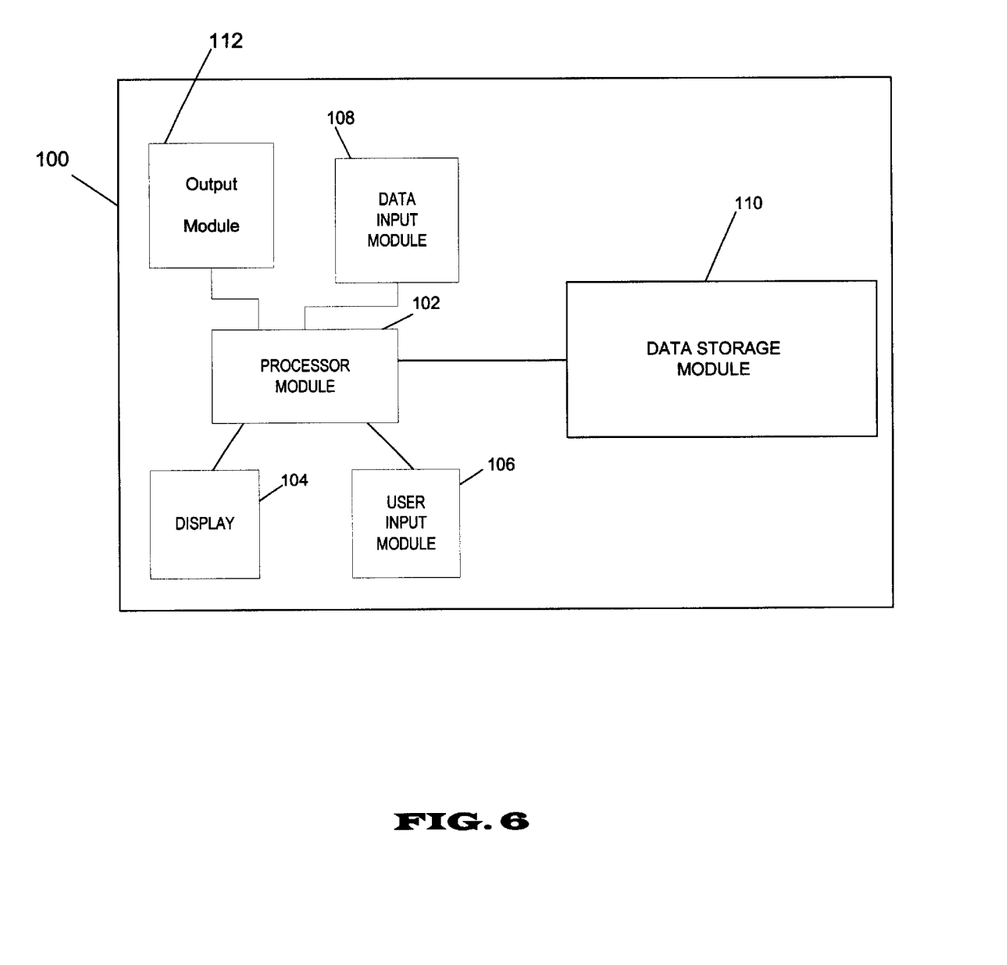
FIG. 6 is a block diagram illustrating the components of the system of the present invention in a stand alone embodiment.
Figure 7:
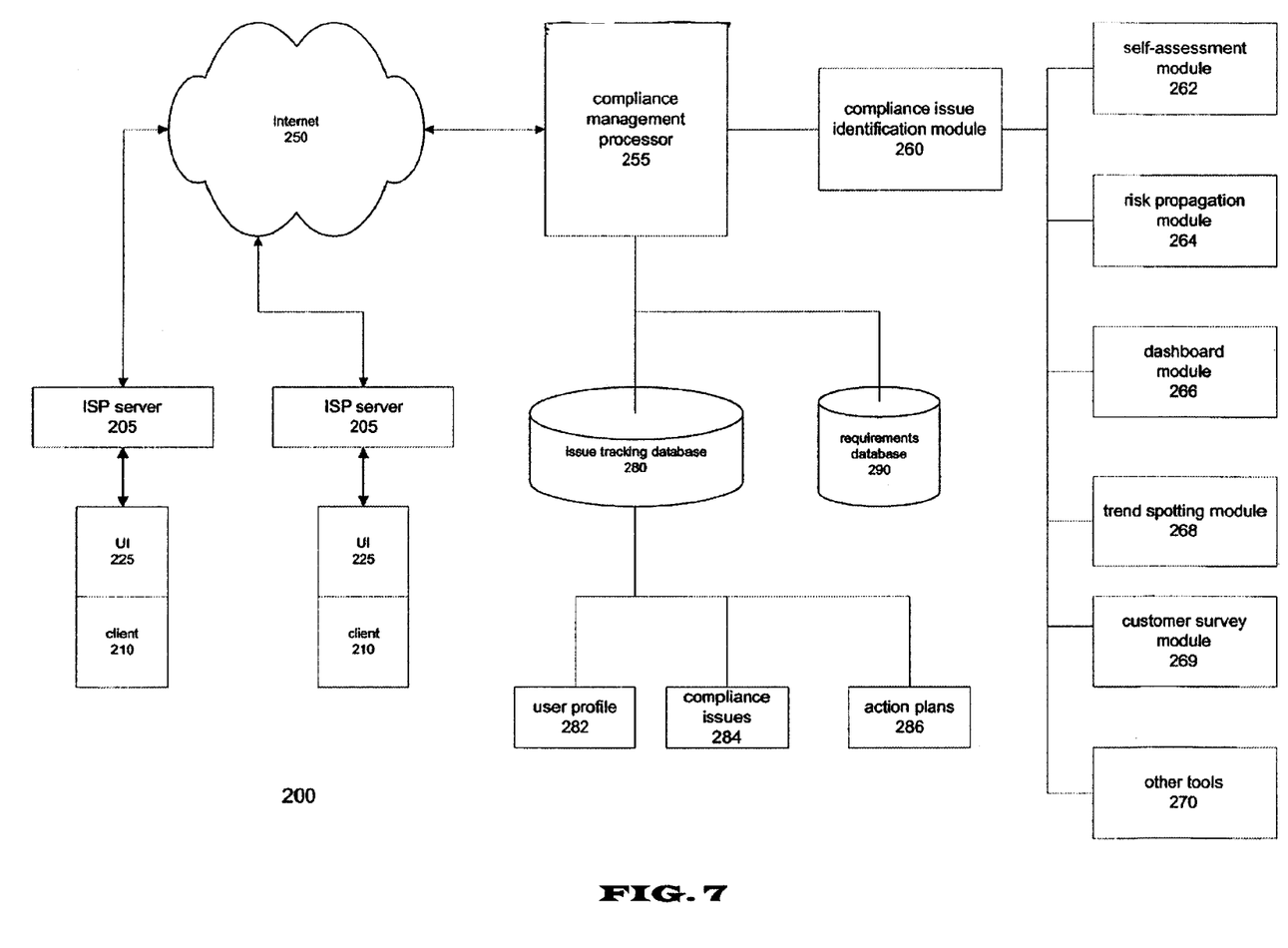
FIG. 7 is a block diagram illustrating the components of the system of the present invention in an internet based system embodiment.

FIG. 1 is a flow chart illustrating the steps for compliance management according to an embodiment of the invention. At step 10, a user may identify one or more business processes subject to regulation. At step 12, compliance requirements may be determined. At step 14, a user may determine compliance ownership of the identified one or more business processes. At step 16, compliance risks/issues may be determined, and an action plan for one or more compliance issues may be created at step 18. At step 20, an action plan may be forwarded to the appropriate compliance owner for issue resolution. At step 22, results of an action plan may be reviewed and analyzed. As will be described in more detail below, the various steps illustrated in FIG. 1 may be performed by a processing system, such as illustrated in FIGS. 6 and 7. Additionally, the sequence of steps in FIG. 1 may be modified in accordance with the present invention. The steps illustrated in FIG. 1 will now be described in greater detail.

At step 10, a user may identify one or more business processes which may be subject to one or more regulations or constraints. According to an embodiment of the invention, a user may select from a variety of products, services, or processes of a business. It is understood that business processes may comprise products, services, processes, forms, or any other aspect of a business that is subject to federal, state, or local regulations. In the example of the insurance industry, a user may desire to review various insurance products and the characteristics thereof including how premiums are determined and collected as well as how products are marketed and underwritten, for example. Other examples of products which may be subject to regulations or other business constraints may include accidental death or accidental disability; various types of annuities; life insurance; medical insurance; auto warranty; etc.

The user may also determine which, if any, regulations and laws apply to the various products. This may include information required to be disclosed to customers and/or policy holders, compliance with various laws against redlining, and other regulations and laws.

At step 12, compliance requirements may be determined or specified. Compliance requirements may include regulations, laws, statutes, internal standards or policies, and other sources of compliance requirements. Federal, state and local agency regulations, laws, and statutes may be considered. Internal regulations may include procedures specific to a company or a company branch. Internal regulations may also include standards imposed by customer service, missions statements, etc.

At step 14, a user may specify compliance ownership of an identified business process. This step may include determining an entity, division, person or set of people in charge of compliance requirements. Examples of entities or individuals with compliance ownership may include a department within a corporation (e.g., compliance department); a certain company within a conglomerate (e.g., compliance corporation); a specific person or a team within a department or company (e.g., compliance officer), or other individuals or groups of individuals who are in charge of compliance requirements.

A compliance officer may be assigned compliance issues according to various schemes. A compliance officer may be an individual, a group of individuals, or an entity who is responsible for the resolution of a compliance issue. For example, a compliance officer may be an individual in charge of a particular product. (e.g., a whole life insurance compliance officer). Thus, there may be a compliance officer assigned to each type of product. In another example, a compliance officer may be an individual who is responsible for a particular regulation or type of regulation (e.g., a person in charge of information disclosures for health insurance). In another example, a compliance officer may be an individual responsible for a division (e.g., a life insurance division compliance officer). In yet another example, a compliance officer may be an individual responsible for a plurality of divisions (e.g., a compliance officer for both life insurance division and annuities division). In the above examples, a single individual or a group of individuals may be designated as a compliance officer through the system of the present invention.

At step 16, one or more compliance risks/issues may be determined. Compliance risks/issues may be identified in various ways. For example, issues may be identified for a single product, such as all issues related to term life insurance. In another example, issues may be identified for a particular regulation or type of regulation, such as a regulation requiring annual updates of equity in a life insurance policy. In another example, issues may be categorized by a division, such as a division dealing with all types of life insurance, (i.e., not having a diverse client base). In yet another example, issues may be identified as issues for internal compliance, such as addressing customer complaints, improving overall customer service, reducing costs, etc. In yet another example, issues may be identified as common issues among various products, regulations, and/or division, such as similar disclosure issues for two or more products. This structure promotes efficiency where common issues may be addressed only once thereby eliminating duplicated efforts.

There are several methods for identifying compliance issues. Issues are generally identified as risk areas that require attention and resolution. For example, a compliance issue may be identified if the issue has a potential net income impact to the business (i.e., reduced revenue, increased costs via fines and penalties, overstated reserves, etc.) or negative publicity. An issue may pose a risk if it has the potential to affect the achievement of business goals and objectives. If an issue has an impact to more than one location, product, or distribution, it may be deemed a compliance issue. An issue that impacts relationships with consumers or producers may also pose a risk.

By failing to identify and address risk areas, a business may be subject to fines, penalties, loss of customers, productivity, and other adverse economic effects. Methods for identifying issues may include self-assessment tools, risk propagation, dashboards, trend spotting, litigation results and other methods.

A self-assessment tool may be used to identify issues according to an embodiment of the present invention. A self-assessment tool may determine potential risk areas based on the severity of an issue, occurrence magnitude, and detection capability. A self-assessment tool may take the form of a questionnaire that is conducted by a compliance officer. A self-assessment questionnaire may be used to highlight compliance risk within a business. Further details are provided below.

Risk propagation may be used to identify compliance issues. Risk propagation involves identifying common risk areas and regulatory requirements and "rolling" these common risk areas down and across to other affected channels (e.g., marketing groups) and functions (e.g., underwriters). For example, different regulations may raise the same or similar issues in different areas or categories of a business. By identifying similar or corresponding issues for different products, or issues raised in a subsidiary corporation, duplicate efforts to address these issues are eliminated.

Dashboards may be used to identify compliance issues according to an embodiment of the present invention. Dashboards may be used to collect, process and display data thereby allowing for identification of issues. For example, dashboards may monitor a complaint resolution process, corporate reporting, cross-business trending, and best practice sharing. Dashboards may be based on self-assessment results, customer complaints, customer surveys, litigation (either against a business or against others competitors in the area), or other sources of information regarding compliance issues. Various external and internal systems may interface and communicate with the system of the present invention as a source of data either raising issues or offering a benchmark to compare against.

Trend spotting may be used to identify compliance issues. Trend spotting may involve identifying compliance issue trends and using these trends to spot additional issues. An example of trend spotting may include identifying trends in various forms of customer complaints, as described in detail below.

Other methods may also be used to identify compliance issues.

At step 18, an action plan for one or more compliance issues may be created. An action plan may be developed in a form that most effectively addresses the type of compliance issue identified. For example, an action plan may be created for a single issue. In this example, an action plan may involve implementing specific acts for employees to take, such as a follow up correspondence with customers one week after a sale. In another example, an action plan may involve preparing specific materials, such as creating or modifying brochures or forms. In yet another example, an action plan may involve implementing specific processes, such as modifying a script for employee calls for soliciting new customers.

Action plans may also be created for multiple issues. For example, an action plan may involve interaction among different areas of a business. In this example, an action plan may address an issue related to disclosure in life insurance which, in turn, may be related to disclosure for annuities and/or disability insurance. In such case, actions required under the action plan may be apportioned among multiple parties or entities.

At step 20, an action plan may be forwarded to an appropriate compliance owner or other appropriate individuals or groups of individuals identified in step 12 via email, Intranet communication, or other modes of communication where the action is forwarded for issue resolution.

At step 22, results of an action plan may be reviewed and analyzed. At this step, feedback regarding the implemented action plan or plans may be received from various sources. This ensures that the action plans are being properly and effectively implemented. The results of an action plan may also be tracked. Based on the results and other sources, the action plan may be reconfigured and updated for improved accuracy and reliability.

An issue tracking database may be used for reviewing and analyzing results of a particular action plan or group of action plans. An issue tracking database may provide a central repository of compliance issues and action plans identified. The issue tracking database may assist the compliance officer in identification, management, and mitigation of compliance risks within the channels and product factories for which they are responsible.

In another example, trend spotting may be used to review and analyze an action plan. For example, a compliance officer may perform complaint trending. Other types of trending may also be implemented. Complaints are an indicator of customer sensitivity, market conduct issues, and consumer compliance exposures. Trends in the volume and nature of complaints over a period of time may indicate potential compliance issues related to various business practices, such as distributor or employee training, sales practices, and customer services. Based on the outcome of the trending, each compliance officer may perform further analysis to identify compliance concerns and define action plans to properly address those concerns.

In performing a trend analysis, complaints may be classified into categories based on complaint reason codes, disposition types, and other categories. For example, complaint reason codes may be classified into sales compliance complaints, process compliance complaints, and customer dissatisfaction complaints. Other classifications may also be used. Within each category, complaints may be further divided into dispositions types, such as acknowledgment of process defect (e.g., corrective action taken, policy reissued), pending status (e.g., awaiting periods, agent will call/handle), and opportunity for process enhancement/training (e.g., no action deemed necessary, further information given). Other disposition types may exist. Trends, such as significant increases in the number of complaints for a particular type of issue, may be observed and further analyzed.

Risk Assessment

Compliance issues may be identified by assessing the risks or potential risks involved in the issue. Tools that may be used to perform a compliance risk assessment may include product-channel risk matrix, self-assessment questionnaire, complaint trending & dashboard, customer surveys and other tools for assessing risk.

Complaint trending and dashboards may be used to obtain customer concerns and opinions through complaints. These complaints may then be analyzed to ascertain trends that may highlight compliance risk. Product-Channel risk matrix may be used to break down a business by product and channel activity. It may also assist in understanding customer sensitivity and how it relates to the products and channels. A self-assessment questionnaire is a management survey that may be used to highlight compliance risks within a business. The questions may have specific areas of focus (i.e., infrastructure or product development) A risk score may highlight areas of concern. The risk score is calculated by multiplying a severity score, an occurrence score and a detection score. A customer survey may be used to detect customer misunderstandings, information regarding agent conduct, effectiveness of marketing material, and other aspects of a customer's purchase experience.

Dashboards

Dashboards may be used to collect, process, and display data allowing for identification of issues. Dashboards may be used to collect dynamic data for analysis. A source of data may include process owners in the operation of a business. For example, process owners may provide information regarding daily operations, license data, sales activities, marketing materials, claim activities, and other information. Additional sources of data may include information gathered from litigation results, complaints, changes in regulations, other sources, or any combination thereof. Dynamic data may then be compared to selected metrics, which may include values that are determined to represent a level of appropriate risk, wherein the results of the comparison may be used to identify compliance issues. This may be accomplished automatically based upon preset parameters, or manually through graphical display or other data presentation.

For example, insurance companies are required to maintain a record of all written complaints pursuant to the state regulations. Some companies may impose additional requirements through internal guidelines. For example, an insurance company may have standards that require recording and tracking all complaints, both written and verbal.

Complaints typically represent customer sensitivity of the services or products provided by a business. For example, complaints may indicate market conduct issues and/or consumer compliance exposures. Trends in the volume and nature of complaints over time may indicate potential compliance issues or exposures related to issues, such as distributor or employee training, sales practices, and customer services. Therefore, some companies may find it beneficial for the compliance officer to perform complaint trending. Based on the outcome of the trending, each compliance officer may perform further analysis to identify compliance concerns and define action plans to address those concerns.

Figure 2:
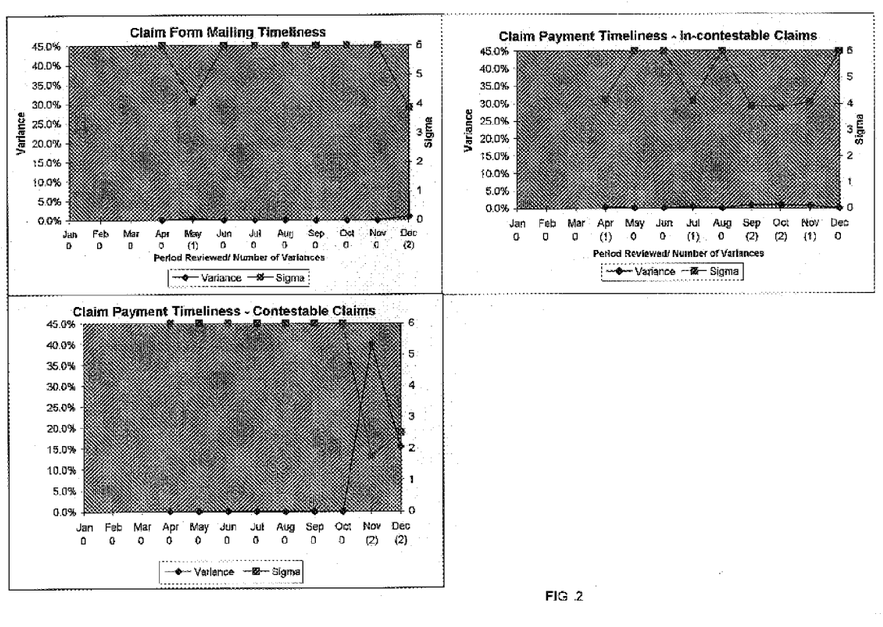
FIG. 2 is an illustration of a dashboard according to an embodiment of the invention.

FIG. 2 illustrates an example of a dashboard for identifying compliance concerns. For example, a claims dashboard may monitor how effectively claims payments are made in compliance with state insurance claims payment regulations. A dashboard may also monitor the company's adherence to internal claims form mailing guidelines. The claims dashboard may be used to determine cross-business trends, and identify and communicate business group best practices.

Product-Channel Risk Matrix

A product-channel risk matrix may be used to analyze a business by products and distribution channels. This may provide a business with a better understanding of the potential degree of customer sensitivity (i.e., customer misunderstanding as a form of compliance risk) associated with a particular product, channel, or a combination thereof.

Self Assessment Tool

A self-assessment questionnaire is a management survey which may be used to help identify potential high risk areas within a business. The questions may have one or more specific areas of focus (i.e., infrastructure, product development, etc.). A risk score may be used to highlight areas of concern. The risk score may be calculated by comparing severity of issue with, occurrence magnitude, and detection capability.

Figure 3:
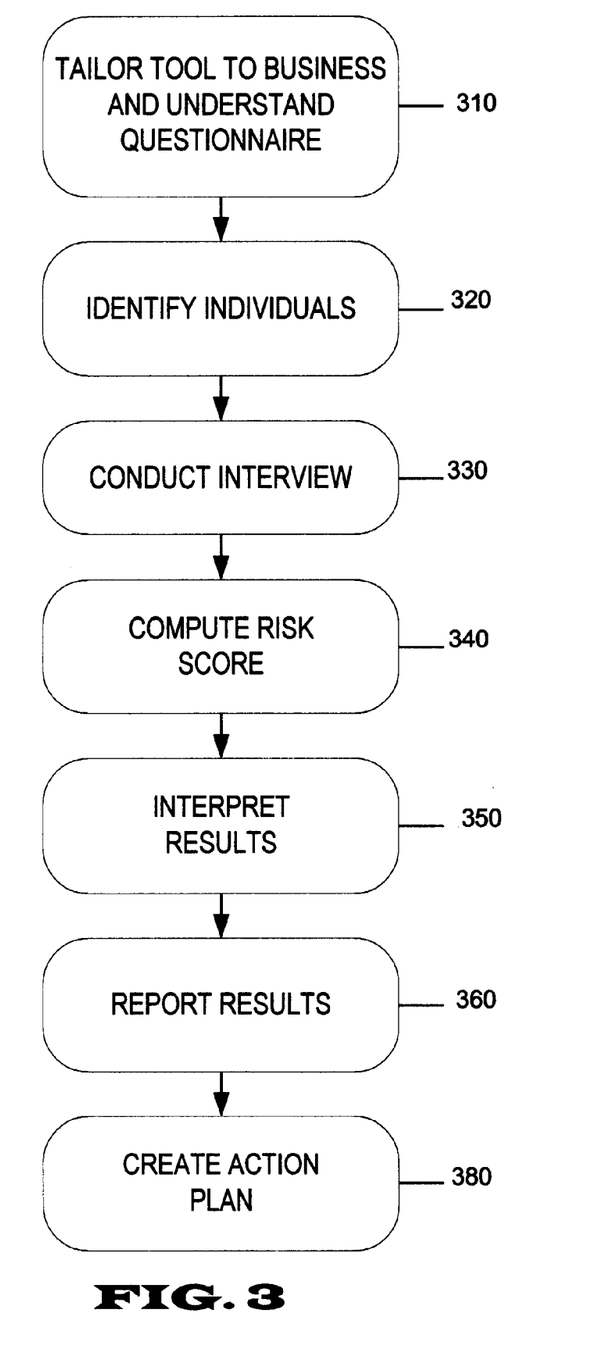
FIG. 3 is a flow chart for risk assessment through a self-assessment questionnaire according to an embodiment of the invention.

FIG. 3 is a flowchart illustrating steps to complete a self-assessment questionnaire. At step 310, the compliance officer may tailor the questions to the needs of a business. Also, the compliance officer may familiarize himself or herself with the questions to effectively elicit complete answers and clarify ambiguities. At step 320, the compliance officer may identify leadership teams or functional leaders to answer the appropriate sections of the questionnaire. At step 330, the compliance officer may conduct one or more interviews with leadership teams and/or functional leaders. For more complete responses, the compliance officer may engage the appropriate individuals in discussions. At step 340, the answers may be translated into a numeric risk score for each section. This may be accomplished by entering the answers into a Risk Matrix spreadsheet, for example. At step 350, the answers may be summarized and high risk areas may be highlighted by examining and studying the questions contributing to a high score. At step 360, the results are reported. Issues identified from the questions may be entered into an issue tracking database. Further analysis may be performed in the identified high risk areas. At step 380, an action plan may be created or developed for issue resolution.

A self-assessment questionnaire is a mechanism designed to help companies and businesses identify potential high-risk areas. The questionnaire may cover high-level business processes, such as infrastructure, market sensing, product development, sales and marketing, servicing, and other business processes. The questionnaire may also contain sections with product-specific questions, as well as a management review section. The answers provided to these questions may then be translated into a numeric risk score for each of the sections.

The self-assessment questionnaire may be administered by a compliance officer. In order to complete the questionnaire, the compliance officer may conduct an interview or a series of interviews with the appropriate individuals in an organization. More than one individual may be interviewed in order to elicit a complete response to a particular question. For example, in order to answer a question directed to whether a new product documentation complies with state requirements, the compliance officer may speak with individuals representing operational units (e.g., new product development, actuarial) as well as compliance and legal personnel. By engaging these individuals in discussion, more accurate and complete responses may be obtained.

The self-assessment tool may be conducted at a predetermined interval, such as monthly, quarterly, semi-annually, annually, or other interval of time. The self-assessment tool may be available to the compliance officer as a means to assess business risk at any time, on an ongoing basis. This tool may be administered whenever a business undergoes significant change (e.g., the implementation of new type of product, utilization of different methods of distribution, or exposure to new regulatory risks).

The compliance officer may then translate the answers to the questions into a numeric value. This may be done by a sliding score (e.g., 1–10) or specific intervals (e.g., 10, 5, or 1; 10, 8, 6, or 1; etc.). In other embodiments, individuals may be asked to complete a multiple choice questionnaire, a rating questionnaire, an essay questionnaire, or any combination of the above. A risk score may be calculated by multiplying a severity score, an occurrence score, and a detection score.

In one embodiment:

Risk score=severity score×occurrence score×detection score

A severity score may be a fixed value which is based on the industry potential for exposure to fines, lawsuits, reputation, or other high risk activities. Alternatively, the severity score may also be variable, which may be based on changes in the industry or other factors. An occurrence score may be a measure of how frequently the risk could occur. These values may be driven by responses to a number of key questions (e.g., how many employees or distributors the company has or the total number of policies in-force). A detection score may be driven by the responses to the questionnaire. This may include detection from outside or detection from inside of the organization. The detection score may be an indication of business capability of detecting and mitigating risk. A risk score is an overall quantification of risk associated with an area. Once high risk scores are identified, further analysis may be performed.

A comparative risk score may be established in each of the risk categories. Relative risk scores may be compared across categories and over time. For example, a score of 250 in the "Anti-Money Laundering" section may indicate to the compliance officer that more attention may need to be focused in that section as opposed to "Advertising Approval" section, which received a score of 75. Similarly, if a risk score in a particular category does not decrease, or increases over time, this may indicate that the business is exposed to risk and further investigation may be required. Thus, the scores by themselves provide a little value. Instead, risk is indicated by comparing relative risk scores.

Figure 4:
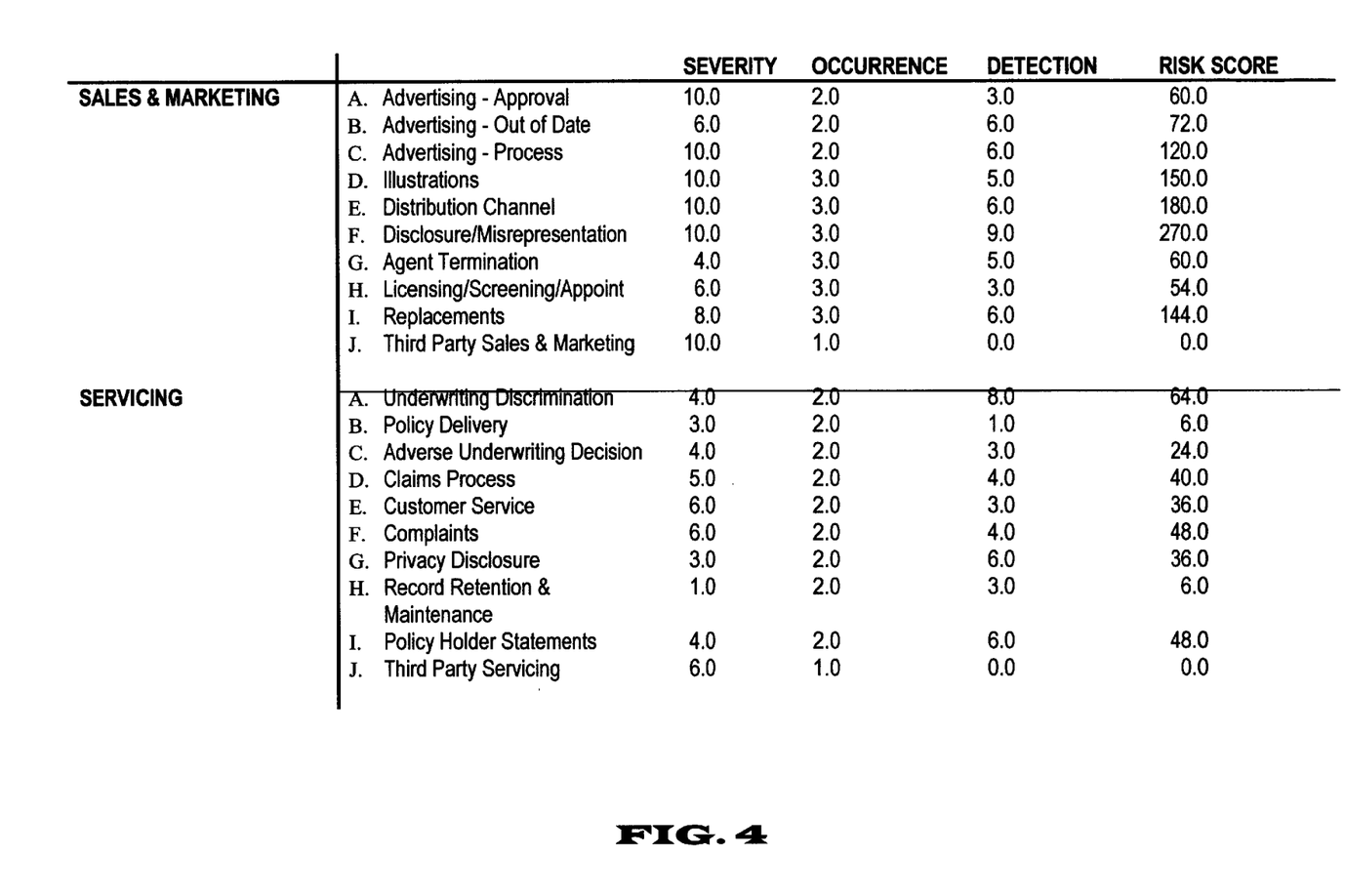
FIG. 4 is a risk assessment matrix for computing a risk score according to an embodiment of the invention.

As illustrated in FIG. 4, a risk assessment matrix may automatically compute a risk score for each issue. A potential high risk area is determined by the value of risk score as compared to other risk scores. In an example illustrated by FIG. 4, potential high risk areas include illustrations, distribution channel, disclosure/misrepresentation, and replacements. These areas exhibit high risk scores relative to the other risk scores. The data provided in FIG. 4 is for illustrative purposes.

After the risk scores have been computed, a compliance officer may examine the results to identify high risk areas. A high risk score may direct the compliance officer to perform further analysis in the high risk area. The compliance officer may take specific action in response to questions which identify process gaps (i.e., the lack of processes or procedures to address a compliance risk). The compliance officer may perform a detailed review of an area identified as being "high risk" by asking additional questions and testing current processes and procedures. For example, the self-assessment tool may reveal that the business has no formal procedures for "red-flagging" unacceptable forms of payment. Based on this information, the compliance officer may conduct a formal review of the business' exposure to money-laundering and may discover that the company routinely accepts cashier checks and bank drafts for payment. The compliance officer may determine if other products or divisions have encountered this issue. It may also be beneficial to look to other divisions, groups, and/or products for potential solutions or suggestions. The compliance officer has now identified a compliance issue which should be addressed. The compliance officer may develop an action plan for resolving the issue and may formally report the issue through an issue tracking database.

Comparisons of risk scores may be made across categories. In this example, the compliance officer may compare high risk scores to determine if similar or corresponding issues apply to other categories. In addition, comparisons of risk scores made be made across businesses. For example, comparisons may be made between auto insurance and life insurance. Also, comparisons of risk scores within a category may be made over a predetermined period of time. A compliance officer may administer a questionnaire periodically (e.g., monthly, quarterly, semi-annually, annually, or for any period of time). If there is an increase in the risk score of a particular area, a potential risk may exist. Similarly, if there is no decrease, this may also be an indication of a potential risk. This comparison made over time may be useful in evaluating the appropriate action to be taken by the business.

The self-assessment tool is intended to be a dynamic mechanism. As the business processes, products, and methods of distribution change, modifications may be made to the tool in order to consistently capture relevant information. Changes in regulations, laws, and internal procedures may also necessitate modifications to the tool. Changes such as these may take the form of additional questions or modifications of existing questions, or may result in adjustments to the severity scores of the different sections of the self-assessment tool. Other modifications also exist, depending on the type of change or growth in the business. Some changes may only pertain to a specific business and may only apply to that specific group. Furthermore, as action plans are implemented, the questionnaire may need to be changed in view of the newly implemented action plans. Thus, the self-assessment tool changes and grows in accordance with the changing needs and focus of a business.

Customer Survey

Customers who have recently purchased a product or service may be given a written or oral survey. This survey may be used to assess items or issues related to the sales process. For example, a customer survey may reveal the items or services purchased and the customer's purchase process or experience. Customer surveys may be used to gather information regarding agent conduct, effectiveness of marketing materials, and customer understanding.

Issue Tracking Database

After assessing the risk and identifying a compliance issue, the identified compliance issue may be categorized into one of three groups consumer, regulatory, and internal control. Consumer issues may include class action lawsuits, existing consumer complaints, inadequate disclosures, and other issues. Regulatory issues may comprise state fines, suspension of business, market conduct citings, and other issues. Internal control issues may include internal procedures not yet formalized, standards not being met, inconsistencies in regulatory requirements, and other issues. Other groups may also be used to categorize identified compliance issues. This provides a consistent definition of compliance issues.

The categorized issues may be assigned different levels of activity. For example, consumer issues may require immediate attention and action. Regulatory issues may require identifying a process and implementing improvements. Internal control issues may require a company to develop standards. Other actions may apply to other categories as well. Depending on the type of business and the categories applicable to the business, other actions may be assigned to these categories. The issues may then be logged into an issue tracking database for tracking purposes.

The issue tracking database and reporting provides focus to drive issue resolution and closure. It serves as a comprehensive issue inventory for the compliance officer by keeping track of all potential and actual issues, establishing functional ownership and accountability, and providing for periodic monitoring to ensure timely resolution. The issue tracking database may also serve as a reporting tool to communicate with corporate and other business locations.

The issue tracking database may provide a central repository of compliance issues, action plans, and other information, which may be identified through regulatory examinations, internal audits, third party reviews, self-assessments, information obtained from pulsing tools (e.g., complaints, customer surveys, or compliance dashboards), business and corporate initiatives, and other sources. It may also assist the compliance officer in identifying, communicating, and monitoring compliance issues. Once a compliance issue has been identified, the compliance officer has the responsibility to oversee the resolution of that issue. The issue tracking database assists the compliance officer in identification, management, and mitigation of compliance risks within the channels and product factories for which they are responsible.

When entering information into the database, a user may assign ownership to an issue to himself or herself. If the issue impacts other locations, there may be discussions with the affected parties prior to entry into the system to determine who the primary owner of the issue is. In addition, there may be a common agreement for wording of the issues and the corresponding action plans. This provides consistency and reduces duplication of efforts thereby promoting efficiency.

The database may track open issues and action plan status and report information at multiple levels (e.g., site level or corporate level). This database is a web-based application that may utilize a relational database where the user may enter new compliance issues and the corresponding action plans. Also, the user may retrieve and view or update existing compliance issues and their corresponding action plans.

This database provides consistency in categorizing, tracking and resolving compliance issues. Also, instituting regular reporting facilitates timely issue resolution and provides an alert system when closure target dates are not being met. A centralized repository for all compliance issues reduces confusion among compliance officers. The database also provides the ability to identify trends and drive process improvements.

The database enables a user to search for a particular compliance issue or a category or group of compliance issues. The user may search via an issue or action plan listing, a user defined ad hoc query that produces reports, or other search methods.

Figure 5A:
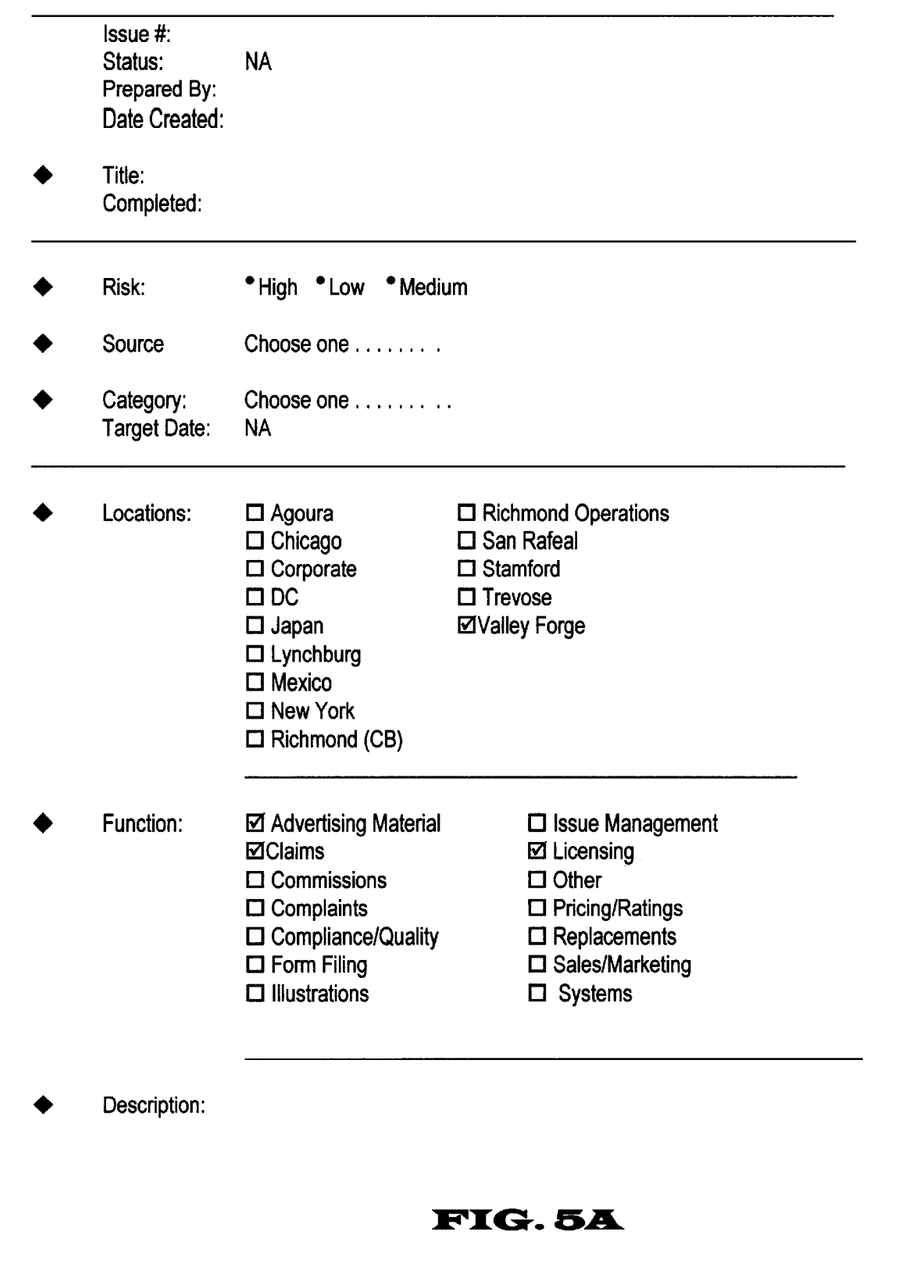
FIGS. 5A and 5B are an example of a screen shot of an issue tracking database according to an embodiment of the present invention.
Figure 5B:
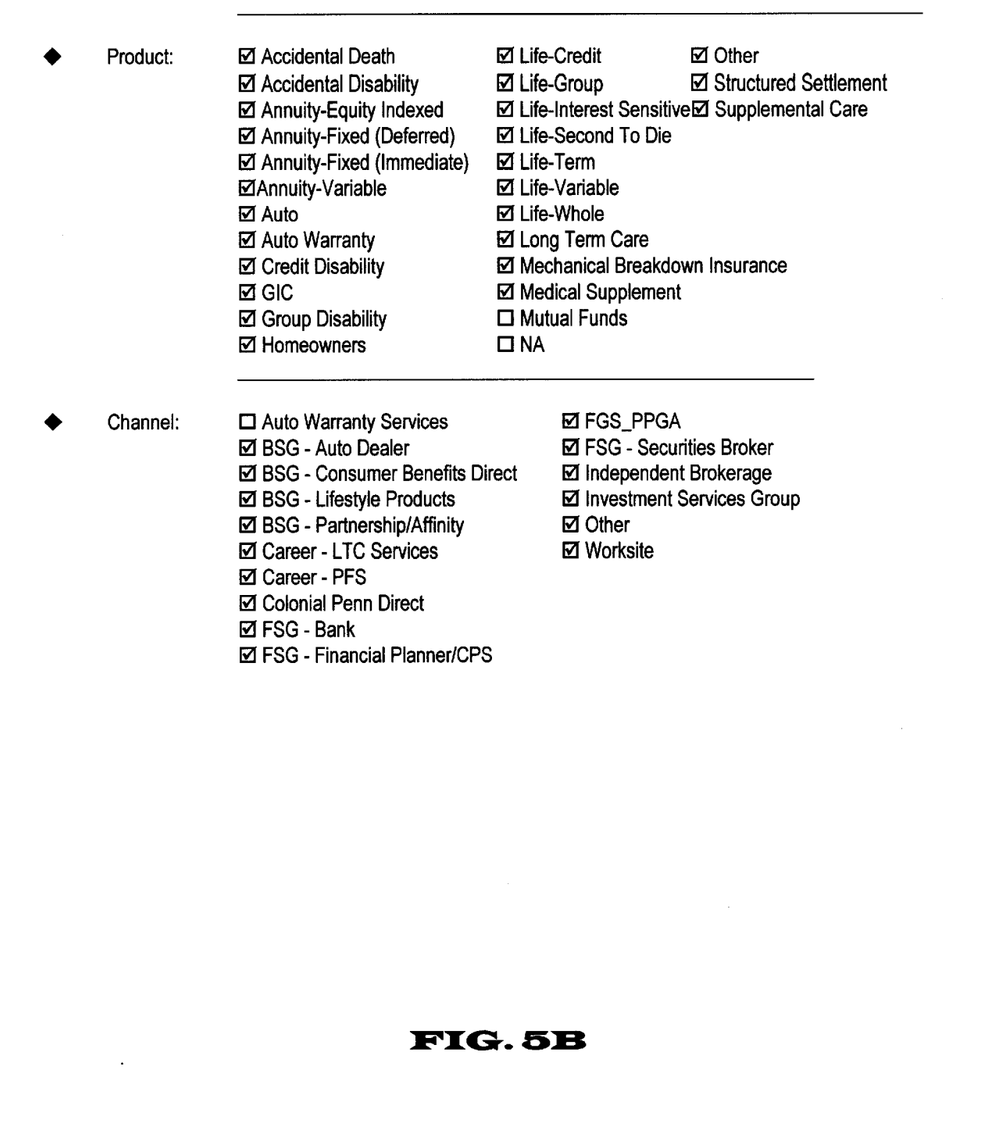

Each user has the ability to control, maintain and update a customized profile which may be a combination of locations, products, and channels. Other information may be included in the profile. This allows the user to view and print reports for all of the criteria selected. Users may also enter issues that impact locations, products, or channels that are not included in the profile. The user may view or report issues regarding locations, products, or channels that are indicated on the user's profile. Thus, if an issue contains a location, product, or channel that is not in the user's profile, the user does not have the capability of viewing or reporting it. FIGS. 5A and 5B show an example of a screen shot illustrating an issue tracking database including a customized user's profile.

The user profile enables a compliance officer to view not only those issues that directly impact the location they are physically located at, but also any products or channels that they may have additional responsibility for.

For example, the profile for a Valley Forge Compliance Officer may include:

Locations=Valley Forge

Products=Auto and Homeowners

Channels Colonial Penn Direct

This profile allows the compliance officer to view issues and run reports that impact Valley Forge, are related to Auto or Homeowners products and are sold through the Colonial Penn Direct channel.

Another example may involve a Mexico Operations compliance officer whose profile is established as follows:

Locations=Mexico

Products=Auto, Life-Whole, Life-Term, Life-Group, Life-Interest Sensitive

Channel=Colonial Penn Direct

If the Mexico Operations compliance officer enters an issue related to the product auto, the issue may also be viewed and reported by the Valley Forge compliance officer since both individuals have these particular products in their user profiles.

The issue tracking database enables a user to add, modify, delete, audit, print an issue or action plan. The user may also run reports for locations, products, and channels that make up a user's profile. A user may also group reports by Locations, Products, or Channels. In addition, a user has the ability to run reports based on a particular issue status, category, risk level, action plan status, issue target date (with specific parameters) and other customized parameters. Reports may also have issues placed in order by Target Date, Status, Category, Risk, or other parameters.

A user may also view statistics within the issue tracking database. For example, an issue statistics module may display a graph illustrating the number of issues per location, product, and channel. The issues reflected in the graph are the ones listed in the user's profile.

System

FIG. 6 is a schematic representation of system 100 for data analysis for risk assessment. System 100 may comprise processor module 102, display 104, user input 106, data input module 108, data storage module 110, and output module 112. Generally, processor module 102 receives inputs from data input module 108 and user input module 106, and provides outputs via display 104 and output module 112. Processor module 102 may also receive inputs and provide outputs through data storage module 110.

According to an embodiment of the invention, processor module 102 may be a standard processor suitable for performing the necessary calculations, including multiple task processing as necessary. As illustrated, processor module 102 may receive inputs from data input module 108 and user input module 106, as well as data from data storage module 110. Data input module may be any conventional data input device, such as a magnetic or optical disk drive, CD-ROM, scanner, modem, internet connection, hard-wire connection, or other device for inputting data to processor module 102. User input module 106 may be any conventional user input device, such as a keyboard, touch-screen, roller-ball, mouse, pointer, or other device for a user to enter and direct manipulation of data in processor module 102.

Data storage module 110 may comprise any conventional storage device, such as a computer memory, a magnetic or optical discs or CD-ROMS, tape-to-tape reels, or other devices for storing data. In the context of Compliance Management, data storage module 102 may contain information related to LTC products, processes, regulations, laws, statutes and other information. Processor module 102 may be capable of accessing data in data storage module 110. Thus, according to an embodiment of the invention, data storage module 110, may be searchable by field or in a variety of other conventional manners.

As illustrated, processor module 102 may provide information through display 104 and output module 112, as well as provide data to data storage module 110. Display 104 may be any conventional display device, such as a television, monitor, or other display device. Output module 112 may be any conventional output device, such as a printer, facsimile machine, magnetic, compact or optical disc drive, modem, internet connection, hard-wire connection, or other device for outputting data to processor module 102.

Internet Connection

FIG. 7 illustrates an embodiment of an internet connected system (ICS) 200 of the present invention. ICS 200 comprises multiple users 210 connected to the Internet 250 through multiple Internet Service Providers (ISPs) 205. In actual practice there may be significantly more users connected to ICS 200 than shown. This would mean that there would be additional users which are connected through the same ISPs shown or through other ISPs. Nevertheless, for purposes of illustration, the discussion will presume four users 210 connected to Internet 250 through two ISPs 205.

According to an embodiment of the invention, users 210 may be users with any computing device capable of accessing Internet 250 through ISP 205. Alternatively, some or all of users 210 may access Internet 250 through a direct connection. In any event, users 210 preferably comprise personal computers having a modem module, a display module, memory module, various input device modules and a central processing module. According to an embodiment of the invention, a system as illustrated above in FIG. 6 may be used. As may be appropriate, users 210 may further comprise special purpose devices optimized solely for various applications but with the ability to access the Internet 250.

Users may each have resident thereon at least one user interface (UI) application module 225. In a preferred embodiment of the present invention, UI application module 225 may include an Internet browser, such as Netscape Navigator™ or Microsoft Internet Explorer™. Users 210 may further comprise a communication application module, such as an email application such as Microsoft Beyond Mail™, Netscape Mail™, Eudora Pro™ or the like.

ICS 200 further includes a compliance management processor 255. Compliance management processor 255 may maintain a high speed, large bandwidth connection to Internet 250. Preferably, a connection may be a T1 or T3 line, although other connections may also be employed. Processor 255 may function to permit clients 210 to interact with each other in connection with various applications, messaging services and other services which may be provided through ICS 200.

Processor 255 may preferably comprise either a single server computer or multiple server configured to appear to users 210 as a single resource. Processor 255 further comprises compliance issue identification module 260. A user may choose self-assessment module 262, risk propagation module 264, dashboard module 266, trend spotting module 268, customer survey module 269, other risk assessment tools 270, or any combination thereof to identify compliance issues. Issue tracking database 280 is connected to compliance management processor 255. A user's profile 282, compliance issues 284, action plans 286, and other information may be stored in issue tracking database 280. A requirements database 290 may store federal, state, local and internal rules, regulations, standards and policies, and other sources of compliance requirements.

According to another embodiment of the invention, a computer usable medium having computer readable program code embodied therein for an electronic computation may be provided. For example, the computer usable medium may comprise a CD ROM, a floppy disk, a hard disk, or any other computer usable medium. One or more of the components of the system may comprise computer readable program code that is provided on the computer usable medium such that when the computer usable medium is installed on a computer system, those components cause the computer system to perform the functions described.

According to one embodiment, processor module 102, data input module 108, data storage module 110, and output module 112 may comprise computer readable code that, when installed on a computer, perform the functions described above. Also, only some of the components may be provided in computer readable code.

Additionally, various entities and combinations of entities may employ a computer to implement the components performing the above described functions. According to an embodiment of the invention, a computer may be a standard computer comprising an input device, an output device, a processor device, and data storage device. According to other embodiments of the invention, various components may be different department computers within the same corporation or entity. Other computer configurations may also be used. According to another embodiment of the invention, various components may be separate entities such as corporations or limited liability companies. Other embodiments, in compliance with applicable laws and regulations, may also be used.

According to one specific embodiment of the present invention, a system may comprise components of a software system. The system may operate on a network and may be connected to other systems sharing a common database. Other hardware arrangements may also be provided.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A computer implemented method for use in compliance management in a business wherein the computer implemented method is conducted at a server, the method comprising the steps of:
   (a) identifying a plurality of business processes subject to compliance requirements by a server identifying means;
   (b) determining compliance ownership of each of said plurality of business processes by identifying an individual or entity responsible for compliance requirements for a particular business by a server determining means;
   (c) determining compliance requirements for each of said plurality of business processes by a server compliance requirement determining means;
   (d) identifying compliance issues based on said compliance requirements wherein the compliance issues are identified by a self-assessment questionnaire wherein at least some answers to the self-assessment questionnaire are translated into a risk score which is computed by multiplying a severity score, an occurrence score and a detection score for identifying at least one area of concern, by a server compliance issue identifying means;
   (e) creating at least one action plan based on identified compliance issues by a server creating means; and
   (f) forwarding said at least one action plan to an appropriate identified individual or entity based on determined compliance ownership by a server forwarding means.

2. The method according to claim 1, wherein identifying compliance issues includes using internal and external inputs where the external inputs comprise at least one of customer complaints, customer surveys, and litigations.

3. The method according to claim 1, further comprising the step of consolidating identified compliance issues; and
   wherein creating said at least one action plan is based on said consolidated identified compliance issues.

4. The method according to claim 1 further comprising the step of tracking the results of said at least one action plan to determine if compliance has improved.

5. The method according to claim 1, further comprising the step of ranking compliance issues based on importance to said business; and
   wherein forwarding said at least one action includes forwarding the most important action plan first as a priority.

6. The method according to claim 5, wherein the step of ranking compliance issues is based on the severity of the compliance issue, the frequency of the compliance issue, and the detection of the compliance issue.

7. The method according to claim 1, wherein the step identifying compliance issues further comprises identifying compliance issues common to a plurality of business processes.

8. The method according to claim 1, wherein the business is providing financial services, and wherein compliance requirements are federal and state regulations.

9. A system for use in compliance management in a business comprising:
- (a) a means for identifying a plurality of business processes subject to compliance requirements;
- (b) a means for determining compliance ownership of each of said plurality of business processes by identifying an individual or entity responsible for compliance requirements for a particular business;
- (c) a means for determining compliance requirements for each of said plurality of business processes;
- (d) a means for identifying compliance issues based on said compliance requirements wherein the compliance issues are identified by a self-assessment questionnaire wherein at least some answers to the self-assessment questionnaire are translated into a risk score which is computed by multiplying a severity score, an occurrence score and a detection score for identifying at least one area of concern, by a server compliance issue identification means;
- (e) a means for creating at least one action plan based on identified compliance issues; and
- (f) a means for forwarding said at least one action plan to an appropriate identified individual or entity based on determined compliance ownership.

10. The system according to claim 9, wherein identifying compliance issues includes using internal and external inputs where the external inputs comprise at least one of customer complaints, customer surveys, and litigation results.

11. The system according to claim 9, further comprising a means for consolidating identified compliance issues; and
wherein creating said at least one action plan is based on said consolidated identified compliance issues.

12. The system according to claim 9 further comprising a means for tracking the results of said at least one action plan to determine if compliance has improved.

13. The system according to claim 9, further comprising a means for ranking compliance issues based on importance to said business; and
wherein forwarding said at least one action includes forwarding the most important action plan first as a priority.

14. The system according to claim 13, wherein ranking compliance issues is based on the severity of the compliance issue, the frequency of the compliance issue, and the detection of the compliance issue.

15. The system according to claim 9, wherein a means for identifying compliance issues further comprises identifying compliance issues common to a plurality of business processes.

16. The system according to claim 9, wherein the business is providing financial services, and wherein compliance requirements are federal and state regulations.

17. A computer implemented method for assessing risk in compliance management wherein the computer implemented method is conducted at a server, the method comprising the steps of:
- (a) forming a self-assessment questionnaire for identifying potential high risk areas within a business wherein the self-assessment questionnaire comprises sections addressing different aspects of a business by a server forming means;
- (b) identifying a leadership team or a functional leader to answer appropriate sections of the self-assessment questionnaire by a server identifying means;
- (c) conducting one or more interviews with the identified leadership team or functional leader to gather answers to the questionnaire by a server conducting means;
- (d) translating the answers to the questionnaire into a numeric risk score for each section by a server translation means;
- (e) interpreting the results and highlighting high risk areas relative to each other by a server interpreting means; and
- (f) reporting the results of the questionnaire by a server reporting means;
wherein the numeric risk score comprises a combination of a severity score, an occurrence score, and a detection score.

18. The method of claim 17 wherein the self-assessment questionnaire is administered at a predetermined interval.

19. The method of claim 17 wherein step (e) further includes utilizing a risk assessment matrix.

20. A computer implemented method for assessing risk in compliance management wherein the computer implemented method is conducted at a server, the method comprising the steps of:
- (a) forming a self-assessment questionnaire for identifying potential high risk areas within a business wherein the self-assessment questionnaire comprises sections addressing different aspects of a business by a server forming means;
- (b) identifying a leadership team or a functional leader to answer appropriate sections of the self-assessment questionnaire by a server identifying means;
- (c) conducting one or more interviews with the identified leadership team or functional leader to gather answers to the questionnaire by a server conducting means;
- (d) translating the answers to the questionnaire into a numeric risk score for each section by a server translating means;
- (e) interpreting the results and highlighting high risk areas relative to each other by a server interpreting means; and
- (f) reporting the results of the questionnaire by a server reporting means;
wherein the numeric risk score is computed by multiplying a severity score, an occurrence score, and a detection score.

21. The method of claim 20 wherein the severity score is a fixed value which is based on the industry potential for exposures to high risk activities.

22. The method of claim 20 wherein the detection score is a variable value which is based on the industry potential for exposures to high risk activities.

23. The method of claim 20 wherein the occurrence score is a measure of how frequently the risk occurs.

24. The method of claim 20 wherein the detection score is a measure of responses to the self-assessment questionnaire.

25. A computer implemented method for assessing risk in compliance management wherein the computer implemented method is conducted at a server, the method comprising the steps of:
- (a) forming a self-assessment questionnaire for identifying potential high risk areas within a business wherein the self-assessment questionnaire comprises sections addressing different aspects of a business by a server forming means;
- (b) identifying a leadership team or a functional leader to answer appropriate sections of the self-assessment questionnaire by a server identifying means;

(c) conducting one or more interviews with the identified leadership team or functional leader to gather answers to the questionnaire by a server conducting means;

(d) translating the answers to the questionnaire into a numeric risk score for each section by a server translating means;

(e) interpreting the results and highlighting high risk areas relative to each other by a server interpreting means; and (f) reporting the results of the questionnaire by a server reporting means;

wherein a high risk score relative to other risk scores is an indication of further analysis and resolution and wherein the numeric risk score comprises a combination of a severity score, an occurrence score and a detection score.

26. A system for assessing risk associated with compliance management comprising:

(a) a means for forming a self-assessment questionnaire for identifying potential high risk areas within a business wherein the self-assessment questionnaire comprises sections addressing different aspects of a business;

(b) a means for identifying a leadership team or a functional leader to answer appropriate sections of the self-assessment questionnaire;

(c) a means for conducting one or more interviews with the identified leadership team or functional leader to gather answers to the questionnaire;

(d) a means for translating the answers into a numeric risk score for each section;

(e) a means for interpreting the results and highlighting high risk areas relative to each other; and (f) a means for reporting the results of the questionnaire wherein the numeric risk score comprises a combination of a severity score, an occurrence score, and a detection score.

27. The system of claim 26 wherein the self-assessment questionnaire is administered at a predetermined interval.

28. The system of claim 26 wherein means (e) further includes utilizing a risk assessment matrix.

29. A system for assessing risk associated with compliance management comprising:

(a) a means for forming a self-assessment questionnaire for identifying potential high risk areas within a business wherein the self-assessment questionnaire comprises sections addressing different aspects of a business;

(b) a means for identifying a leadership team or a functional leader to answer appropriate sections of the self-assessment questionnaire;

(c) a means for conducting one or more interviews with the identified leadership team or functional leader to gather answers to the questionnaire;

(d) a means for translating the answers into a numeric risk score for each section;

(e) a means for interpreting the results and highlighting high risk areas relative to each other; and (f) a means for reporting the results of the questionnaire;

wherein the numeric risk score is computed by multiplying a severity score, an occurrence score, and a detection score.

30. The system of claim 29 wherein the severity score is a fixed value which is based on the industry potential for exposures to high risk activities.

31. The system of claim 29 wherein the detection score is a variable value which is based on the industry potential for exposures to high risk activities.

32. The system of claim 29 wherein the occurrence score is a measure of how frequently the risk occurs.

33. The system of claim 29 wherein the detection score is a measure of responses to the self-assessment questionnaire.

34. A system for assessing risk associated with compliance management comprising:

(a) a means for forming a self-assessment questionnaire for identifying potential high risk areas within a business wherein the self-assessment questionnaire comprises sections addressing different aspects of a business;

(b) a means for identifying a leadership team or a functional leader to answer appropriate sections of the self-assessment questionnaire;

(c) a means for conducting one or more interviews with the identified leadership team or functional leader to gather answers to the questionnaire;

(d) a means for translating the answers into a numeric risk score for each section;

(e) a means for interpreting the results and highlighting high risk areas relative to each other; and (f) a means for reporting the results of the questionnaire;

wherein a high risk score relative to other risk scores is an indication of further analysis and resolution and wherein the numeric risk score comprises a combination of a severity score, an occurrence score and a detection score.

* * * * *